United States Patent [19]

Gudbrandsen

[11] 4,380,858

[45] Apr. 26, 1983

[54] METHOD OF MAKING A COMPOSITE PROFILE

[75] Inventor: Hans Gudbrandsen, Gjovik, Norway

[73] Assignee: A/S Raufoss Ammunisjonsfabrikker, Raufoss, Norway

[21] Appl. No.: 212,711

[22] PCT Filed: Mar. 12, 1980

[86] PCT No.: PCT/NO80/00005

§ 371 Date: Nov. 16, 1980

§ 102(e) Date: Nov. 7, 1980

[87] PCT Pub. No.: WO80/01929

PCT Pub. Date: Sep. 18, 1980

[30] Foreign Application Priority Data

Mar. 16, 1979 [NO] Norway ................................ 790897

[51] Int. Cl.[3] ........................ B23P 11/00; B21D 39/00

[52] U.S. Cl. ........................................ 29/418; 29/509

[58] Field of Search ...................... 29/155 R, 413, 418, 29/505, 509, 514; 49/DIG. 1; 52/403

[56] References Cited

U.S. PATENT DOCUMENTS

| | | | |
|---|---|---|---|
| 4,096,678 | 6/1978 | Diels et al. | 52/403 |
| 4,128,934 | 12/1978 | Doring | 49/DIG. 1 |
| 4,158,512 | 6/1979 | Hasselbacher | 49/DIG. 1 |
| 4,272,941 | 6/1981 | Hasselbacher et al. | 49/DIG. 1 |

FOREIGN PATENT DOCUMENTS 2729021 8/1978 Fed. Rep. of Germany .

*Primary Examiner*—Ervin M. Combs
*Attorney, Agent, or Firm*—Watson, Cole, Grindle & Watson

[57] ABSTRACT

A method and a device for making a composite profile comprising two metal members which are held apart from each other by means of at least two insulating bars whose edges are clamped in grooves formed between flanges on the metal members by deforming the flanges, said method comprising the use of a basic, one-piece metal profile in which inner flanges are interconnected, the connection being broken in conjunction with deformation of the flanges, said device comprising cutting elements adapted to at least partly break the connection between the inner flanges.

4 Claims, 1 Drawing Figure

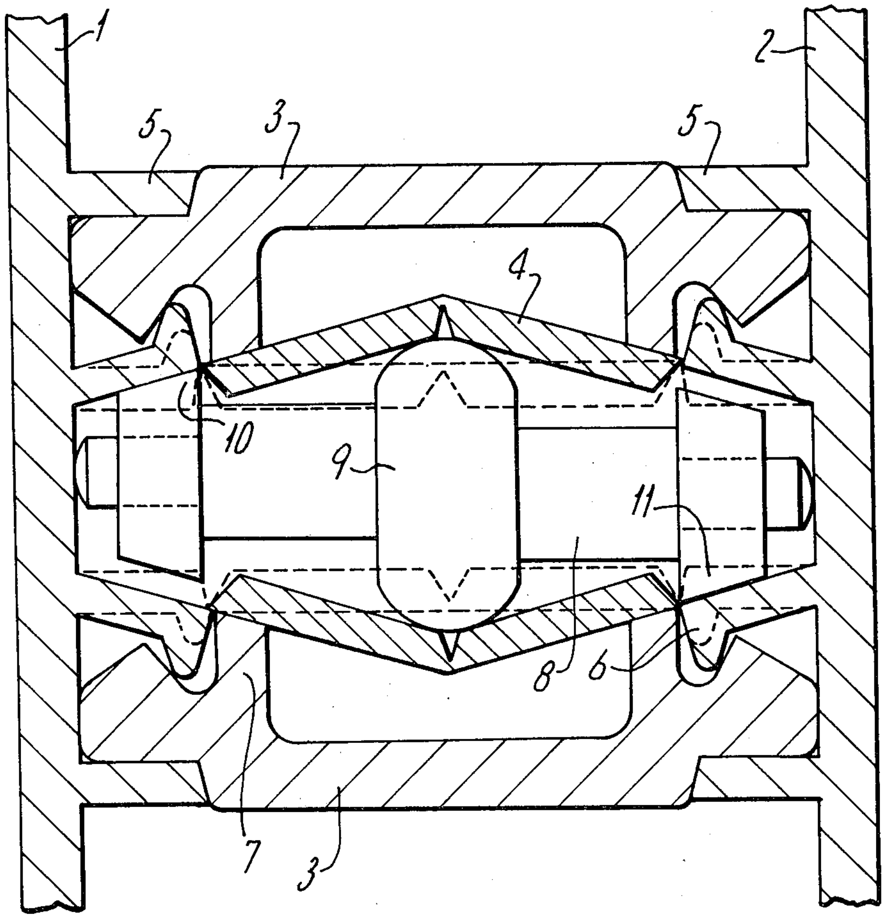
1
2
5
3
5
4
10
9
11
8
6
7
3

METHOD OF MAKING A COMPOSITE PROFILE

BACKGROUND OF THE INVENTION

1. Field of the Invention

The present invention relates to the making of a composite profile comprising two metal members which are held apart from each other by means of at least two insulating bars, the edges of these bars being clamped in grooves formed between flanges on the metal members, by deforming at least the inner of the flanges which form these grooves. More specifically, the present invention relates to a method and a device for making such a composite profile.

2. The Prior Art

A composite profile of the type mentioned is disclosed in publicly accessible Norwegian patent application No. 76.4017. This application discloses the making of such a profile by placing the metal members (extruded profiles) and the insulating bars in mutually correct positions, and then forcing a mandrel lengthwise through the hollow space defined by the metal members and the insulating bars to cause the inner flanges in the metal members to be deformed into grooves running longitudinally along the insulating bars.

This prior art method, however, requires that the metal members be properly fixed relatively to each other during the joining operation. The finished composite profiles of the kind in question are suited for use for instance as sills and frames for doors and windows, and the dimensions of the profiles must lie within small tolerances, both on account of the appearance and because the profiles are to be joined in corners.

The purpose of using insulating bars is of course to reduce the heat transfer compared with profiles which consist entirely of metal, usually an aluminum alloy. The insulating bars, which may be made from a suitable plastic material, or bakelite rubber, have a low heat conductivity. However, the problem of achieving a low heat transfer in the transverse direction of the profile is not solved solely by a low heat conductivity in the material or materials of the profile, because convection in the air inside the profile and radiation inside the profile also play important roles.

It is well known that well reflecting surfaces inside such profiles cause a small heat transfer by radiation and that dark and dull surfaces cause a large heart transfer by radiation.

A main object of the present invention is to solve the above-mentioned problems relating to the dimension tolerances and the shape accuracy.

A further object is to take advantage of the known facts about radiation and thereby to achieve a reduced heat transfer.

Experiments have shown that anodizing has a considerable influence on the heat transfer by radiation. Thus, it is advantageous that the inner surfaces in the composite profile are not anodized. Calculations show that it is possible to achieve a reduction of the total heat transfer in the transverse direction of the profile, i.e., along the width of the insulating bars, of about 17% by use of un-anodized surfaces, compared with anodized surfaces. It is, however, necessary that the metal profiles are anodized on the outer surfaces, and the problem to be solved is how to avoid anodizing of the inner surfaces while anodizing the outer surfaces.

It is well known that profiles which are immersed in an anodizing bath will only be anodized on surfaces which are not shielded by other walls of the profile. Thus, hollow profiles (having walls which define a space which is only open from the ends of the profile) will mainly be anodized only exteriorly, the inner surfaces being anodized only a very short distance from each end of the profile.

Metal profiles which form parts of the composite profile shown in the Norwegian patent application No. 76.4017 will be anodized also on those surfaces which face into the hollow space formed by the succeeding insertion of the insulating bars. There are two possible ways to avoid this anodizing of the inner surfaces, namely to apply a coating to avoid anodizing or to carry out the anodizing after the insertion of the insulating bars.

None of these methods are desirable, the first because it increases the cost of manufacture and the second because it presupposes that the insulating bars withstand the immersion in the anodizing bath.

The present invention brings about the possibility to avoid these undesirable methods and still to achieve a low rate of heat transfer.

SUMMARY OF THE INVENTION

The present invention relates to a method as disclosed introductorily, and which is characterized in that the insulating bars are inserted with their edges in the grooves, these grooves being formed in a basic metal profile in which the inner flanges are interconnected in pairs through bridging elements, so that the basic profile makes a hollow profile, and in that the inner flanges are deformed outwardly in conjunction with at least partly separating the flanges from the bridging elements, whereupon the bridging elements are removed from the composite profile.

A device according to the present invention is characterized in that it comprises cutting elements for at least partly to separate the inner flanges from the bridging elements, in conjunction with the outward deforming of the flanges.

Among others the following advantages are achieved with the present invention:

During the deforming of the inner flanges the bridging elements will cause a contraction of the metal profile because of the tensile force occurring in the bridging elements. The tensile force is increased if also the bridging elements are deformed outwardly into the space between ribs on the insulating bars. The insulating bars will be subjected to a pressure from various sides, and they will be clamped and fixed very tightly in the finished profile.

The bridging elements also prevent the metal members from taking incorrect relative positions, and particular precautions to prevent relative displacement of the metal members are not necessary, whatever the dimensions of the profile might be.

Moreover, the basic metal profile may be anodized in a usual manner, without taking precautions to prevent anodization of the inner surfaces. The basic metal profile is hollow, and anodization of inner surfaces will only take place a short distance inwardly from each end. The anodization of the inner end surfaces will usually be of no importance to the finished product, and the ends may of course be cut away as waste material if desirable.

According to a preferred embodiment of the method the separating of the flanges from the bridging elements and the deforming of the flanges are performed as a continuous process, by cutting along the transition lines between the flanges and the bridging elements simultaneously with deforming the flanges outwardly, and also simultaneously with deforming the central areas of the bridging elements outwardly. There may be applied insulating bars having longitudinal ribs extending in the vicinity of the transition lines, such ribs making abutments for the ends of the bridging elements (when seen in a cross section of the profile). Thereby is achieved a very efficient separation, and before the separation is completed the bridging elements act to increase the clamping of the insulating bars because of the tensile force in the bridging elements, this force acting to pull the outer walls of the profile against the insulating bars. Thus, the bridging elements contribute to increase the clamping of the insulating bars until the moment of complete separation between the bridging elements and the flanges. It is, however, not necessary that the bridging elements be completely separated from the flanges during the process described above, as the bridging elements may be torn loose in a succeeding operation.

Preferably, weakening lines are formed in the basic metal profile in order to simplify the separation between the flanges and the bridging elements. At least one weakening line may also be formed along the bridging elements in order to make the elements easier to deform.

The present invention brings about the advantage that raw edges which are present on the flanges after the removal of the bridging elements are not visible on the finished product.

In the following the invention will be described more in detail by means of embodiments shown on the accompanying drawing. The FIGURE illustrates the method according to the invention, and also shows an embodiment of a device according to the invention.

The FIGURE shows two metal members 1 and 2, which in a basic metal profile are interconnected as indicated by broken lines, through the flanges 6 and the bridging elements 4. In the manufacturing stage, shown in full lines, the inner flanges 6 have been deformed outwardly, into engagement with the insulating bars 3, and the central areas of the bridging elements 4 have also been deformed outwardly relative to their initial position, partly due to the deformation of the flanges 6 and partly because ribs 7 on the insulating bars 3 have acted as anvils during the separation of the bridging elements from the flanges. The insulating bars have been pressed into the space between the edges of the outer flanges 5.

The composite profile may be made by means of a device comprising cutting edges 10 adapted to separate the bridging elements 4 from the inner flanges 6, by pulling or pushing the device through the hollow space defined by the metal members and the insulating bars. The device comprises expansion elements 11 adapted to deform the flanges 6 outwardly. The cutting edges and the expansion elements may have such a shape that they diverge in the direction oppositely of their movement, in order to cause a successive cutting and deformation by their movement longitudinally through the profile.

The embodiment of the device shown also comprises a central element 9 adapted to force the central area of each bridging element 4 outwardly and into the space between the ribs 7 on the insulating bars 3.

During the movement of the device through the profile the flanges 6 will gradually be deformed outwardly, and the insulating bars 3 wil be forced outwardly because the bridging elements 4 abut against the ribs 7. During the movement of the device the edges 10 will cut into the metal. During the deformation of the flanges 6 the bridging elements 4 will be subjected to a tensile force which act to pull the outer walls of the metal members 1 and 2 towards the insulating bars 3. Preferably the separation between the bridging elements 4 and the flanges 6 is not completed until the insulating bars 3 are forced tightly against the outer flanges 5.

The central element 9 acts to deform the central areas of the bridging elements 4 outwardly, in order to facilitate the separation.

As previously mentioned, it is not necessary that the device causes a complete separation. The bridging elements 4 and the inner flanges 6 may still be interconnected when the device has been moved through the profile. If so, the bridging elements 4 may in a simple manner be torn out from the composite profile. Even when the movement of the device causes complete separation it will be necessary to pull out the bridging elements, and it is of little importance whether or not some connection between the bridging elements and the flanges remains.

As shown, the cutting elements 10 and/or the expansion elements 11 may be in the form of rollers which are rotatably mounted on a carrier 8. Preferably the rollers are located in such a manner that they protrude from opposite sides of the carrier. The drawing shows only two rollers, but it will be understood that the device may comprise four or more rollers adapted to deform all four of the inner flanges and to cut along all four such flanges by moving the device once through the profile. The forces exerted by the rollers will then counteract each other in such a manner that no free forces will occur in transverse direction of the carrier 8.

The central element 9 may be connected to or form a part of the carrier 8.

In the embodiment of the composite profile shown the metal members 1 and 2 are mutually equal. This is of course not necessary, and the metal members may have a shape suited for any particular application, for instance having channels for the insertion of glass, or the metal members may form parts of large profiles or plate elements.

I claim:

1. A method of making a composite profile by clamping at least two insulating bars so as to fixedly extend between two metal members, each of the metal members including a pair of inner flanges and a pair of outer flanges, the pairs of inner and outer flanges of one metal member at least initially extending toward the corresponding pairs of inner and outer flanges of the second metal member, and a separate deformable bridging element extending between the corresponding inner flanges of the two metal members so as to form an enclosed hollow space therebetween, the method comprising .

(a) inserting two insulating bars between the two metal members so that the respective ends of each insulating bar will fit in the groove defined between the corresponding inner and outer flanges of each metal member, (b) bending each of the inner flanges of each metal member toward the associated outer flanges of the metal member such that they will contact the end of the insulating bar therebetween and clamp it in position, (c) at the same time deforming each of the deformable bridging elements away from the hollow space which it helps form and at least partially separating the deformable bridging elements from connection with the associated inner flanges, and (d) removing the bridging elements from between the two metal members.

2. The method as defined in claim 1 wherein each insulating bar includes a rib on one side near each end thereof, each said insulating bar being inserted between the two metal members in step (a) such that the ribs thereon face the associated deformable bridging element, and wherein in step (c) each deformable bridging element is deformed sufficiently that it contacts each of the ribs on the associated insulating bar.

3. The method as defined in claim 2 wherein in step (c) the center area of each bridging element is forced away from the hollow space which it helps to form.

4. The method as defined in claim 2 wherein each insulating bar includes a step portion near each end thereof on the side opposite the side having the ribs, and wherein in step (c) each insulating bar is pressed toward the respective outer flanges such that the outer flanges sealingly fit within the step portions of the associated insulating bar.

* * * * *